Sept. 8, 1970     E. C. BUFFINGTON ET AL     3,526,966
DEEP SUBMERSIBLE SLOPE MEASUREMENT SYSTEM
Filed July 19, 1968     2 Sheets-Sheet 1
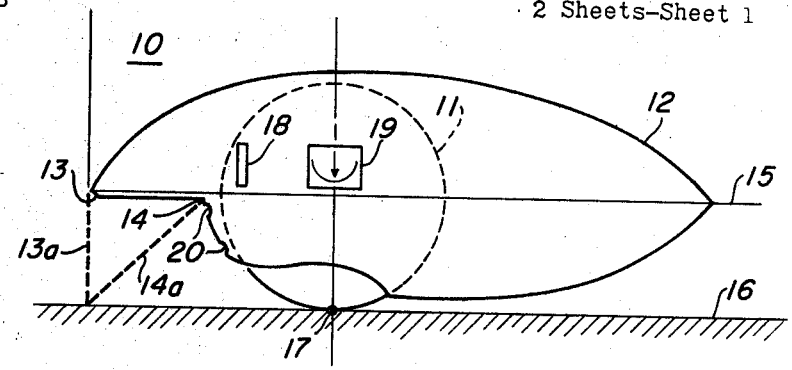
FIG. 1
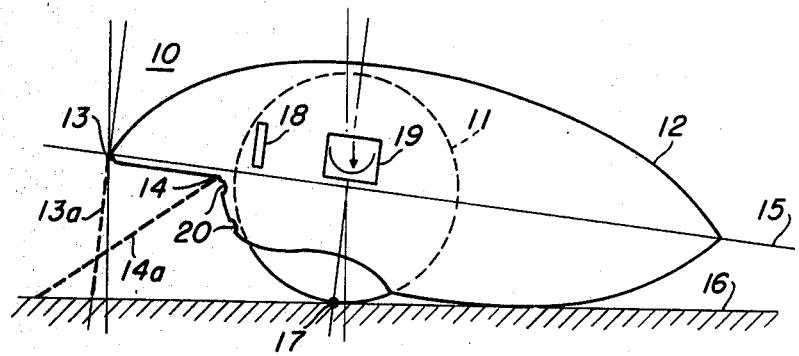
FIG. 2
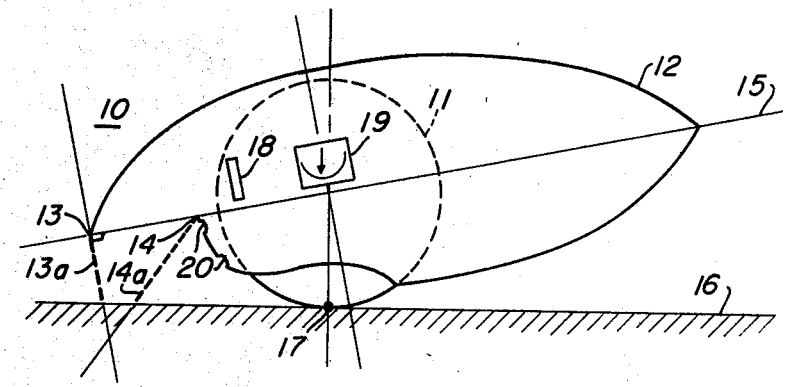
FIG. 3
FIG. 4a     FIG. 4b
INVENTORS
EDWIN C. BUFFINGTON
ROBERT L. SEELEY
BY
ATTORNEYS

INVENTORS
EDWIN C. BUFFINGTON
ROBERT L. SEELEY
BY

ATTORNEYS

3,526,966
DEEP SUBMERSIBLE SLOPE MEASUREMENT SYSTEM
Edwin C. Buffington and Robert L. Seeley, San Diego, Calif., assignors to the United States of America as represented by the Secretary of the Navy
Filed July 19, 1968, Ser. No. 746,231
Int. Cl. B63c *11/00;* G01c *9/00*
U.S. Cl. 33—204                                 7 Claims

ABSTRACT OF THE DISCLOSURE

Light beam generating means are positioned on a deep submersible vessel in alignment such that the projection of the light beams will coincide at a spot on the slope upon which the vessel is resting only when a reference plane through the vessel is aligned parallel to the slope. Angle measuring means within the vessel are then employed to meaure the angular displacement relative to the reference axis thereby providing an accurate measurement of the outside slope upon which the vessel is resting. In operation, the vessel is maneuvered until the described alignment and coincidence of the light beams at a single point is achieved.

---

The invention described herein may be manufactured and used by or for the Government of the United States of America for governmental purposes without the payment of any royalties thereon or therefor.

BACKGROUND OF THE INVENTION

Increased oceanographic exploration has included the measurement of the slopes of ocean bottom surfaces, for example, from deep submersible vessels. The accurate measurement of bottom slopes at great depths is of basic importance in the evaluation of the efficacy of echo sounder equipments and the data which such systems develop. Deep submersible vessels such as Deepstar can be operational on the ocean floor to depths of four thousand feet. This depth includes a considerable portion of the continental slope and all of the continental shelf. Other deep submersible vessels can descend to even greater depths.

In the prior art, slope angles have been measured from echo sound records; however, such records are almost invariably subject to error or erroneous interpretation. In the past, determination of such errors has been approached by the assumption of given apical angles for sound cones from echo sounder transducers in accordance with the particular equipments being employed. Appropriate geometry has been developed and graphic solutions found. However, no wholly accurate and reliable way has been devised to verify the correctness of these solutions without some empirical data being developed from the slopes being measured. One prior art method of empirical measurement is to use lead line sounding. This method, however, has certain inherent errors and inaccuracies. Direct, "in situ" measurement provides a real slope measurement from which valid comparisons and thus error calculations can be made.

With the development of the Deepstar type of deep submersible vessel and its concomitant operational capability to depths of four thousand feet, as well as other submersibles capable of descending to even greater depths, a platform is available in which simple gravity dependent instruments such as pendulum or bubble inclinometers can be installed within the vessel's pressure proof portion where the pilot, scientists, and other observers ride. From these instruments, appropriately mounted on the interior of the deep submersible vessel, inclinations can be measured to fractions of degrees.

However, if the pilot only visually estimates the parallelism of horizontal plane of symmetry of the submersible (as used herein the term "horizontal plane of symmetry" means the major reference plane which is defined by the "fore and aft" axis and "thwartships axis" of symmetry of the vessel. This plane need not achieve horizontality in the absolute sense), to which the interior inclinometers are adjusted and referred, and the plane of the sea floor, only an approximated measurement of the sea floor slope can be realized.

Accordingly, what is required to effect an accurate measurement of the sea floor from such a deep submersible vessel, is a system whereby the attitude of the deep submersible vessel can be adjusted until its plane of horizontal symmetry is exactly and precisely parallel to the plane of the sea floor on which it rests. When such a condition is effected, the interior instruments can be read to precisely and accurately determine the exterior slope on which the vessel is resting.

SUMMARY OF THE INVENTION

The system described in detail hereinafter fulfills this requirement and permits the pilot or observers within a deep submersible vessel to adjust its attitude about a fore-and-aft and a vertical axis upon the slope of an ocean floor, for example, at great depths, while observing the relative position of two light spots projected on the ocean floor from outside the pressure proof enclosure of the vessel. When the two spots coincide at a maximum measured inclination fore-and-aft, with the thwartships axis horizontal, the horizontal plane of symmetry of the submersible is exactly parallel to the ocean floor and an interior reading can be made which accurately and precisely measures the slope of the outside sea floor.

Accordingly, it is a primary object of the present invention to provide a unique and novel system for accurately and precisely measuring the outside slope from within deep submersible vessel resting upon the slope.

Another important object of the present invention is to provide for measuring the slope outside a deep submersible vessel by a system and arrangement of equipment which permits the final measurement and deterination of angular disposition of the vessel wholly from within the vessel.

An important ancillary object of the present invention is to permit the measurement of outside slope upon which a deep submersible vessel is resting by direct-reading, conventional angle measuring means.

A further object of the present invention is to devise a system for measuring the outside slope upon which a deep submersible vessel is resting, which system permits accurate prealignment prior to the vessel's submersion.

Yet another object of the present invention is to provide such a system for measuring the outside slope from within a deep submersible vessel upon which the vessel is resting without any disturbance to the slope or its environment such as may be occasioned by certain prior art slope measurement practices.

BRIEF DESCRIPTION OF THE DRAWINGS

In the drawings:

FIG. 1 is a side view of a typical deep submersible vessel employing the system of the present invention.

FIG. 2 is a side view of a typical deep submersible vessel employing the present invention and illustrating one aspect of its principle of operation.

FIG. 3 is a side view of a typical deep submersible vessel employing the present invention illustrating yet another aspect of its principle of operation.

FIGS. 4a and 4b are front and side views, respectively, of a deep submersible vessel employing the present invention and illustrating its operational principles.

DESCRIPTION OF THE PREFERRED EMBODIMENTS

Figure 5A:
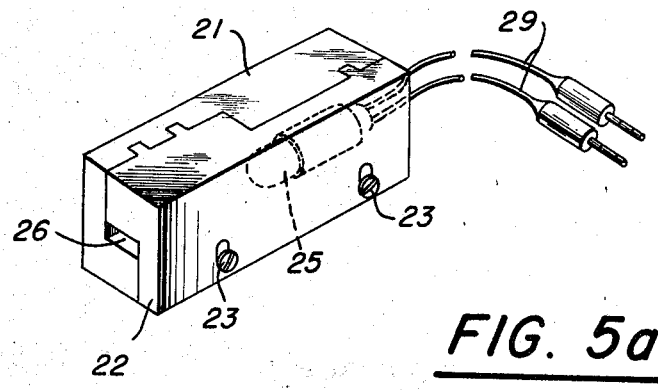
FIGS. 5a and 5b are perspective views of a light source assembly suitable for employment in connection with the present invention and illustrated in assembled and exploded views, respectively.

FIG. 1 illustrates a deep submersible vessel indicated generally at 10 which may be of a Deepstar type. Such vessels are frequently provided with an observer's or pilot's sphere 11 adapted to accommodate the persons operating the vessel. The spherical configuration is chosen because of its desirable resistance to extremely high pressures encountered in deep oceanography work. The remainder of the vessel as shown by the outline 12 may comprise a shroud portion customarily employed to control the buoyancy of the entire vessel including the pressure proof sphere 11 and to carry ancillary equipment and instrumentation.

In the illustration of FIG. 1, a first means for generating a light beam is located at the bow of the vessel as indicated generally at 13. This first means for generating a first light beam 13, in the particular illustration of FIG. 1, is mounted and aligned to direct a light beam vertically downward as indicated by the dash lines 13a. A second means for generating a second light beam 14 is positioned and supported so as to direct a light beam as indicated by the dash lines 4a downwardly to intersect the first light beam 13a. Such intersection, however, will only occur when the fore-and-aft axis through the horizontal plane of the deep submersible vessel 10, as indicated at 15, is parallel with the sea floor shown at 16. Windows 20 in the sphere 11 afford the observers a view of the exterior environment including the projected light beams. In the particular configuration of an embodiment of the present invention employed with the Deepstar type of vessel as illustrated in FIG. 1, the plane of the sea floor 16 is seen to be tangent with the sphere 11 at the point 17.

Before the deep submersible vessel is submerged, its basic horizontal plane of symmetry is determined from the symmetrical center of the sphere 11 and from the configuration of the shroud and other structural members such as indicated generally at 12. Interior inclinometers are mounted with their vertical axes normal to this plane as shown at 18 and 19 and their axes of swing are arranged to be parallel to the fore-and-aft and thwartships axes of symmetry through the plane, respectively. The projection of a plane tangent to the base of the sphere and parallel to the basic horizontal plane of symmetry is determined by measurements taken from positions known to be on the basic horizontal plane.

Then the forward light on the for-and-after axis, as shown at 13, is mounted at a maximum convenient distance from the sphere and adjusted so that its projects its light beam vertically downward or normal to the basic plane. If the basic plane does not have absolute horizontality, the image or light spot is projected on a plate or removable flat surface which is placed so as to be part of a plane parallel to the basic horizontal plane and tangent to the base of the sphere 11.

The second light means 14 is mounted on the fore-and-aft axis but in proximity to the sphere and is adjusted so that its beam is directed obliquely with the projection of the spot it generates coinciding with the spot generated by the light means 13. Thus, the two spots or images developed by the first and second beams through means of the light 13 and 14 will merge into one and coincide when the basic horizontal plane of the deep submersible vessel 10 and the horizontal surface on which the sphere 11 is resting are parallel.

Under most conditions if these planes were not parallel, the spots generated by the lights 13 and 14 will be separated by a distance which is a function of the angle between the planes and in a direction which indicates the direction of departure from parallelism.

When the deep submersible vessel 10 is maneuvered into a position as described, where the light beams generated by the light means 13 and 14, respectively, project spots on the sea floor which merge and are coincident, the angular disposition of the inclinometer 19 will indicate the slope of the sea floor 16 in terms of accuracy to a small part of a degree. This reading is made on the interior of the sphere by the observers or pilot and thus can be determined accurately and conveniently.

The thwartships inclinometer 18 is employed for purposes of maneuvering the vessel into a position where it can be reliably determined that the maximum angular slope is being accurately and reliably read from the inclinometer 19. Special situations and the procedures to be followed in order to ensure such an accurate reading will be more fully described hereinafter.

The operation of the system of the present invention will be more fully understood from the description of several possible situations that may be encountered as follows hereafter. In a rather idealized situation the plane of the deep submersible vessel and the plane of the sea floor may be parallel and absolutely horizontal as shown in FIG. 1. In this case, the two light spots coincide and the inclinometers 18 and 19 both indicate absolute horizontality. This is, of course, a duplication of the relationship which was established and artificially imposed on the deep submersible vessel before it was employed operationally in a submerged dive and at the time that the inclinometers 18 and 19 were initially adjusted as described hereinbefore.

In a second case, the plane of the deep submersible vessel 10 and the plane of the sea floor may be parallel, but both inclined to the absolute horizontal. When the two light spots coincide under these conditions, the inclinometers read the angle to the absolute which is the slope of the sea floor. In a situation of this kind, the basic relationships as illustrated in FIG. 1 also apply, the only change being that the angular rotation is at a different angular disposition with respect to absolute horizontality.

Another possibility is that the plane of the deep submersible vessel and the plane of the sea floor may be at an angle, with the deep submersible vessel down by the stern. In this instance, the light spots will separate so the spot from the first light means 13 appears at a point on the sea floor nearer to the window of the sphere than that from the second light means 14. FIG. 2 illustrates this situation and it can be seen that a vessel of the Deepstar type is at an extreme stern depression where the stern is at rest on the sea floor. The numerical designations in FIG. 2 are the same for respective parts of the system as were employed in FIG. 1. As shown in FIG. 2, the observer or pilot within the sphere 11 will observe two distinct and separate spots on the sea floor because their point of coincidence is considerably above the actual level of the sea floor.

Yet another situation may exist where the plane of the deep submersible vessel and the plane of the sea floor are at angles to each other but with the submersible down by the bow as shown in FIG. 3. In this instance, as in the illustration of FIG. 2, the first and second light spots, as developed from the light beams generated by the light means 13 and 14, are separate. It will be noted that the light beam from light means 13 is farther forward and away from the observer's window than the spot generated by the second light beam from the light generating means 14. This situation will obtain regardless of the absolute slope of the sea floor, as was also the case for the situation illustrated by FIG. 2.

An understanding of the geometry of the various situations which may occur will indicate that, to achieve a parallelism between the reference plane of the deep submersible vessel and the plane of the sea floor, it is necessary to control the thwartship's axis running through the center of the sphere in its reference plane. This, of course, is also true of the calibration plane tangent to the base of the sphere in its parallel relationship to the reference plane of the deep submersible vessel, when the angle indicating and measuring means, such as inclinometers, are being initially calibrated and adjusted as was previously described.

The desired determination of the angle of the reference plane of the deep submersible vessel relative to the plane of the sea floor can be achieved independently of any external observation or reference by observing the angle measuring means within the deep submersible vessel. Such means may take the form of a pendulum or inclinometer and, more particularly, that angle measuring means which is adjusted to measure deviations from an axis running thwartships. Instrumentally this is readily and accurately achieved and it should be noted that a check on absolute thwartship horizontality must be made with every slope measurement.

FIGS. 4a and 4b illustrate this situation where a deep submersible vessel such as the Deepstar is so situated that it is necessary that the vessel be maneuvered and reoriented until a condition of absolute thwartship horizontality is achieved. Under these conditions a true slope measurement may be made. FIG. 4a illustrates the deep submersible vessel in a front view where it is resting on a sea floor at a point tangent to an approximate thirty degree slope, but where the fore-and-aft axis is substantially parallel to the contour of the sea floor. In this specific type of situation there are two conditions under which two light spots, as generated from the light beams emanating from the first and second light beam generating means, will coincide on the sea floor. One of these conditions (not illustrated) is when the thwartships' axis is parallel to the slope, giving the deep submersible vessel a lateral inclination substantially corresponding to the slope. This would be an inclination of approximately thirty degrees in the instance of the slope illustrated in FIG. 4a. Under these conditions the inclination measured on the fore-and-aft axis is substantially zero degrees which is not, of course, the inclination of slope but rather the inclination of the contour, i.e. zero degrees, in the case of the contour and slope illustrated in FIGS. 4a and 4b. Although this problem may exist theoretically, it is not a practical problem in many of the deep submersible vessel precludes a lateral tilt of such magnitude. The described condition, however may occur for inclinations of a few degrees.

Assuming the situation illustrated in FIG. 4a, the thwartships axis is absolutely horizontal and the fore-and-aft axis is horizontal so that the focus points or projections of the two light beams produce a concidence at at a point above the sea floor bottom on the vertical projection and below the horizontal projection of the depth at point of tangency. However, the deep submersible vessel may be tilted forward by depressing the bow and rotating it around the point of tangency until the coincidence point of the two light beams produces a single spot on the sea floor.

This situation is illustrated particularly in FIG. 4b and it will be seen that the results produced are anomalous because the two light beams are producing a coincident spot on the sea floor bottom while the thwartships axis is absolutely horizontal. Accordingly, the slop which is measured under these conditions is not the true slope of the sea floor bottom but rather an apparent slope. To avoid such false measurements a required part of the slope measuring procedure, when employing the system of the present invention, must include the rotation of the deep submersible vessel around an axis normal to its basic horizontal plane of symmetry, while maintaining the thwartships axis horizontal with the two spots projected by the light beams coinciding on the sea floor.

Thus, when the submersible is facing upslope, the measured slope will decrease with movement in both a port and starboard direction away from the aximuth of a maximum. The maximum is the true slope measurement and in this manner the procedure will eliminate the possibility of a false slope measurement as previously described and illustrated by FIGS. 4a and 4b.

FIG. 5a is an illustration of a free-flooding light beam generating means which may be advantageously employed within the system of the present invention. Such a light beam generating means is seen to comprise first and second body members 21 and 22 which are secured together by screw means 23 passing through slots 24 to enclose a light source 25. The body members 21 and 22 are so configured as to form a slot 26 through which the light beam passes. The light assembly 25 is accordingly free-flooding, i.e. does not exclude the surrounding medium of sea water, but admits it to direct contact with the light assembly 25.

Figure 5B:
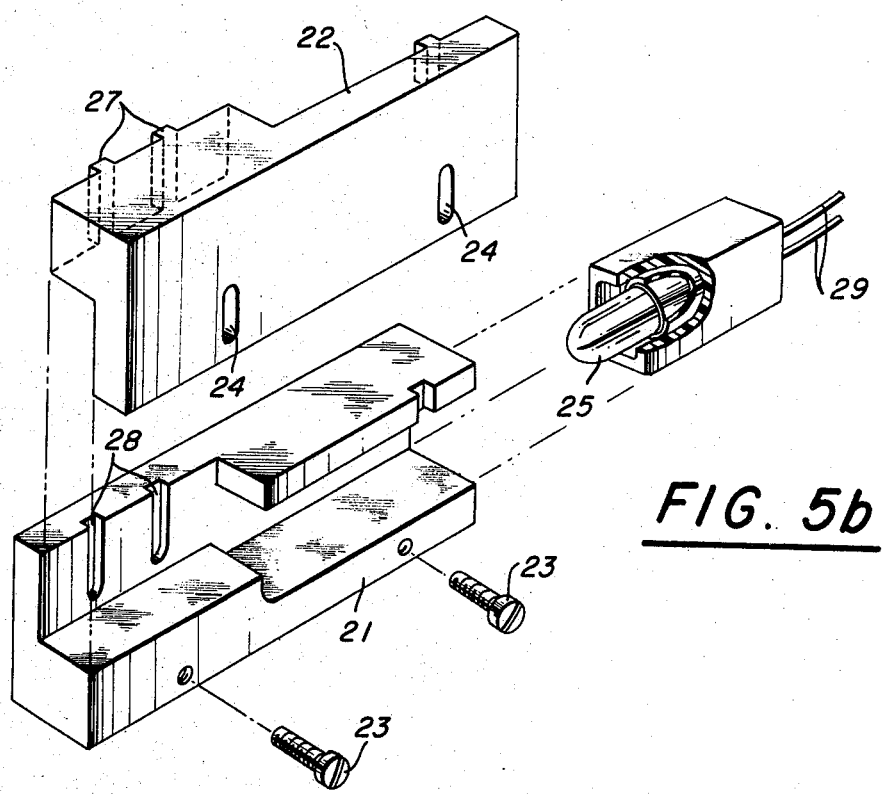

Light beam generating means of the type illustrated in FIG. 5a, may be appropriately mounted on the external portions of the deep submersible vessel to provide the first and second light generating means as previously described in connection with the illustrations of FIGS. 1, 2, 3, 4a and 4b. FIG. 5b is an exploded view showing the first and second body members 21 and 22 and particularly illustrating the manner in which embossments 27 on the body member 22 are aligned with matching slots 28 on the body member 21 to provide upward and downward aligned adjustment so as to afford selective dimensional control of the slot formed at 26 as illustrated in FIG. 5a. The light assembly 25 is provided with appropriate electrical connections 29 which, in the usual case, pass through a pressure seal to the internal portions of the deep subersible vessel to an appropriate electrical source to generate the light beam as described.

Obviously many modifications and variations of the present invention are possible in the light of the above teachings. It is therefore to be understood that within the scope of the appended claims the invention may be practiced otherwise than as specifically described.

What is claimed is:
1. A system for measuring outside slope from within a deep submersible vessel having a fore-and-aft axis comprising:
   a first means supported on said deep submersible vessel for generating a first light beam;
   second means supported on said deep submersible vessel and defining a reference axis relative to said first means point of support,
   said second means generating a second light beam directed to intersect said first light beam at a point in a line tangent to the lowermost portion of said vessel and parallel to said reference axis; and
   angle measuring means supported within said vessel, said angle measuring means being disposed to measure angular displacement relative to said reference axis, whereby alignment of said first and second light beams in intersection on an outside slope on which said vessel rests, indicates the angle of said slope from within said vessel as shown on said angle measuring means.
2. A system for measuring outside slope from within a deep submersible vessel as claimed in claim 1 and wherein said lowermost portion of said vessel is substantially spherical.
3. A system for measuring outside slope from within a deep submersible vessel as claimed in claim 1 wherein said means for generating first and second light beams are mounted in a plane which includes the fore-and-aft axis of the vessel.
4. A system for measuring outside slope from within a deep submersible vessel as claimed in claim 3 wherein said first means for generating a light beam is disposed orthogonally relative to said fore-and-aft axis.
5. A system for measuring outside slope from within a deep submersible vessel as claimed in claim 1 wherein said first and second means for generating first and second light beams are positioned to project light beams in a field of view observable from within said vessel.

6. A system for measuring outside slope from within a deep submersible vessel as claimed in claim 3 and including means supported within said vessel for indicating the deviation from the horizontal of the axis perpendicular to the fore-and-aft axis.

7. A system for measuring outside slope from within a deep submerible vessel as claimed in claim 1 wherein said means for generating said first and second light beams are free-flooding light sources mounted on the exterior of said vessel.

References Cited

UNITED STATES PATENTS

| | | | |
|---|---|---|---|
| 2,316,751 | 4/1943 | Adler | 33—46.5 |
| 3,169,500 | 2/1965 | Cousteau et al. | 61—69 |
| 3,277,430 | 10/1966 | Hagemann | 33—204.3 |

LEONARD FORMAN, Primary Examiner

S. L. STEPHAN, Assistant Examiner

U.S. Cl. X.R.

33—46; 61—69; 114—16